United States Patent [19]
Haug

[11] Patent Number: 5,265,949
[45] Date of Patent: Nov. 30, 1993

[54] STEEL CROSSPIECE

[75] Inventor: Walter Haug, Blaustein, Fed. Rep. of Germany

[73] Assignee: Kassbohrer Karl Fahrzeugwerke GmbH, Fed. Rep. of Germany

[21] Appl. No.: 829,069
[22] PCT Filed: Aug. 21, 1990
[86] PCT No.: PCT/EP90/01386
    § 371 Date: Feb. 5, 1992
    § 102(e) Date: Feb. 5, 1992
[87] PCT Pub. No.: WO91/02675
    PCT Pub. Date: Mar. 7, 1991
[51] Int. Cl.$^5$ .................................... B62D 55/26
[52] U.S. Cl. ............................. 305/35 EB; 305/54
[58] Field of Search ............. 305/35 EB, 35 R, 39, 305/54

[56] References Cited
U.S. PATENT DOCUMENTS

| | | | |
|---|---|---|---|
| 3,390,924 | 7/1968 | Bumbaugh | 305/35 EB |
| 3,824,174 | 8/1974 | Thomas | 305/54 X |
| 4,059,315 | 11/1977 | Jolliffe et al. | 305/35 EB |
| 4,165,137 | 8/1979 | Stedman | 305/54 |
| 4,332,424 | 6/1982 | Thompson | 305/54 X |
| 5,033,801 | 7/1991 | Beeley | 305/35 EB X |
| 5,199,771 | 4/1993 | James et al. | 305/35 EB X |

FOREIGN PATENT DOCUMENTS

| | | |
|---|---|---|
| 327705 | 4/1975 | Austria . |
| 2714531 | 3/1977 | Fed. Rep. of Germany . |
| 2094636 | 2/1972 | France . |

*Primary Examiner*—Russell D. Stormer
*Attorney, Agent, or Firm*—Samuels, Gauthier & Stevens

[57] ABSTRACT

The track is equipped with a plurality of bands, which extend parallel to one another in the direction of motion and which are interconnected by a large number of steel crosspieces in the transverse direction. The crosspieces have a U-shaped cross-section and are equipped with a U-shaped yoke composed of two U-legs and of a connection web extending therebetween. The first U-leg has a connecting leg as an extension, said connecting leg extending inwards via a bend and being followed, after an additional bend, by a sword, which extends approximately parallel to said U-legs. Offering the advantage of economy-priced production, said steel crosspiece is intended to show more advantageous resistance values. This is achieved on the basis of the features that the second U-leg is welded to the end of the first connecting leg via an inwardly bent, second connecting leg and that a house-like hollow space is thus formed in the interior of the U-shaped yoke.

21 Claims, 7 Drawing Sheets

STEEL CROSSPIECE

BACKGROUND OF THE INVENTION

The present invention refers to a track for track-type vehicles, in particular for track-type vehicles used for preparing ski slopes, comprising a plurality of bands extending parallel to one another, said bands being aligned in the direction of motion and having transversely secured thereto a large number of steel crosspieces, which, when seen in cross-section, are equipped with a U-shaped yoke composed of two U-legs and of a connection web extending therebetween, the first U-leg being provided with a connecting leg as an extension, which extends inwards via a bend, and, after an additional bend, with a sword following said connecting leg and extending approximately parallel to said U-legs.

A steel crosspiece of the above-mentioned type is known from practical experience. It is primarily used on hard ground, e.g. on icy slopes. It is constructed as an open profile and has an asymmetrical cross-section. In view of the fact that the shear center in the case of this open profile is located outside of the geometry, high torsional stress will occur. Likewise, high bending stress will occur as well.

The known steel crosspiece consists of high-quality quenched and tempered steel, which causes substantial production difficulties. Straightening and stamping processes are necessary, and a heat treatment has to be carried out as well. This often entails the risk of distortion. The steel crosspieces often have to be readjusted, and this can result in a formation of capillary cracks.

Due to the asymmetrical nature of the profile, it is necessary to produce separate steel crosspieces for the left and for the right track, and this increases the manufacturing costs.

Other problems arise in connection with the fastening of the track crosspieces to the guide yokes for driving as well as in connection with the bands.

In particular when driving on a piste, the bands are affected at the point of connection with the crosspieces and they are partly destroyed. The guide plates and spike holders normally provided on such crosspieces are arranged in a disadvantageous manner on the known crosspieces and cannot be secured optimally.

Light metal crosspieces used for tracks and belonging to a different class of device are known from practical experience as well; these light metal crosspieces are already provided with a symmetrical profile. Most of them are manufactured as an extruded part, and they are equipped with a comparatively thickened base portion tapering towards the sword. In order to be able to provide a sufficient connection between the light metal crosspieces and the bands, the crosspieces are equipped with a central web, which is normally provided with a tapped hole for the fastening screws.

Light metal crosspieces of this type are used in soft snow. They offer the advantage of low weight and of a high moment of resistance. They are, however, not cheap and they wear within a comparatively short period of time.

SUMMARY OF THE INVENTION

The present invention is based on the task of providing a steel crosspiece for tracks of the type mentioned at the beginning, which can be manufactured at a reasonable price and shows advantageous resistance values and which permits durable fastening to the bands.

In accordance with the present invention, this task is solved by the features that the second U-leg is welded to the end of the first connecting leg via an inwardly bent, second connecting leg, a houselike hollow space being thus formed between the first and second U- and connecting legs.

The present invention provides a solution for contrary aims. On the one hand, the costs for producing a steel crosspiece are to be reduced; on the other hand, said steel crosspiece is to be improved with regard to its wear resistance and it is intended to be used for providing better fastening to the bands.

In the case of the present invention, the extension of the second leg simultaneously serves several purposes: the profile is closed so that there is also the possibility of providing it with a symmetrical structural design. At the same time, a hollow space is created, which has an approximately houselike cross-section and which, as will still be explained hereinbelow, serves to safely secure the steel crosspiece to the bands because it provides the necessary free space within which the fastening screws can be arranged and secured in position and on the basis of which it is also possible to secure additional accessory parts, such as guide plates and spike holders, to the crosspieces. Moreover, the houselike hollow space provides high resistance values and guarantees a torsional stress which is lower than that which occured in the case of the former steel crosspieces.

When the steel crosspiece according to the present invention is provided with a symmetrical structural design, it will no longer be necessary to manufacture separate left and right steel crosspieces, as is required in the case of the prior art.

One advantageous further development of the present invention provides the feature that the steel crosspiece consists of a high-strength fine-grained steel. Such a steel is weldable and it can also be welded at the place of use, i.e. in situ. It has excellent mechanical values even in the case of low temperatures. This is particularly important when it is used on snow. A heat treatment is no longer necessary, and, consequently, the hitherto required readjustment can be dispensed with as well. The fine-grained steel can be cold rolled. The radii at the locations of connection between the connection web and the U-legs can be kept very small, when an adequate rolling operation is carried out. This will enlarge the area of contact between the connection web and the bands. Hence, the use of support means, which have hitherto protected the retention holes for the fastening screws, is no longer necessary.

An additional advantage is to be seen in the fact that the steel crosspiece can be produced from a cold-rolled steel sheet and that the thickness of material can be the same throughout the whole steel crosspiece.

In the case of the known steel crosspieces, holes for inserting the fastening screws for the bands are already provided in the connection web of the U-shaped yoke. The present invention offers the advantageous possibility of providing the holes with aprons projecting into the hollow space as well as of arranging a female thread therein. These aprons can be produced e.g. by a flow drilling process. In the case of said process, a fast rotating mandrel is introduced into the material. It penetrates the sheet metal and forms the aprons in question at the location of exit. The aprons can subsequently be provided with the thread.

It is, however, also possible to subject the steel crosspiece to hot rolling and to form, in the course of said hot-rolling process, a thickened strip on the inner side in the area of the intended holes; the holes for the fastening screws are then provided in said thickened strip.

In the case of another variant, at least one insert, e.g. an insert strip, provided with tapped holes is arranged in the hollow space for interconnecting the steel crosspieces and the bands. In this case, it will suffice to provide the connection web simply with through holes. The actual anchoring of the fastening screws is effected with the aid of the insert strip.

An advantageous further development of the present invention provides the feature that at least one of the two connecting legs has a reduced thickness of material in comparison with the U-legs. Such a reduction can be carried out e.g. by providing at least one of the connecting legs with a recess on its inner side associated with the houselike hollow space. The reduction of the wall thickness of the connecting legs can serve several purposes. The houselike hollow space within the steel crosspiece is one of the factors determining the moment of resistance of said crosspiece. The U-shaped yoke with its two U-legs serves as the reinforcing backbone of the crosspiece. A reduction of the thickness of material of one or of both connecting legs will result in an advantageous combination between the dimensionally stable U-shaped yoke on the one hand and the softer V-shape of the connecting legs on the other. When a load is applied to the sword, a connecting leg having a reduced wall thickness will be able to absorb the load forces in a dampening manner.

This is especially true in the case of shocks. Depending on whether only one of the connecting legs has a reduced thickness of material, or whether both connecting legs have such a reduced thickness of material, a symmetrical or an asymmetrical dampening effect will be produced. The forces will be transmitted from the connecting legs to the U-legs, which are able to yield elastically outwards.

It follows that the reduction of the material of one or of both connecting legs offers not only the advantage of lower weight, but also the important advantage of better dampening within the steel crosspiece. Said dampening will result in a mode of driving which is less detrimental to the environment and, at the same time, in more comfort for the vehicle.

A double function is obtained due to the fact that, on the one hand, the connecting leg or the connecting legs having a reduced thickness of material cause a dampening effect and that, on the other hand, the U-shaped yoke defines an essentially dimensionally stable backbone, which, in spite of the dampening effect achieved, retains the shape of the steel crosspiece and, consequently, also of the sword and causes the driving forces to be taken up.

BRIEF DESCRIPTION OF THE DRAWINGS

Some embodiments of the connection will be described hereinbelow on the basis of a drawing, in which.

DETAILED DESCRIPTION OF PREFERRED EMBODIMENT

Figure 1:
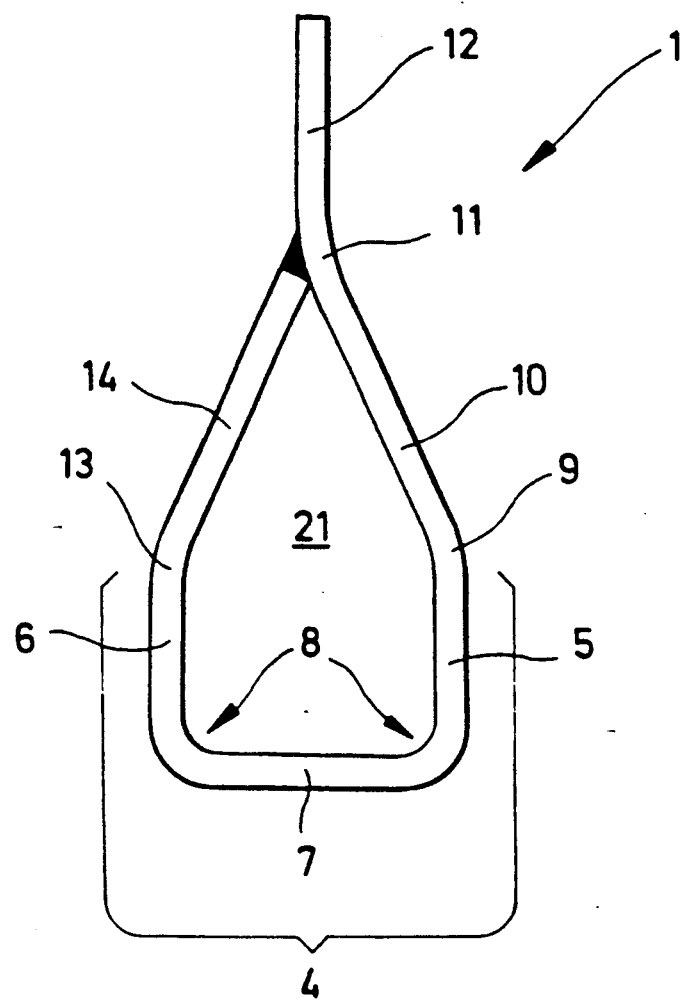
FIG. 1 shows a side view of a steel crosspiece according to the present invention.
Figure 4:
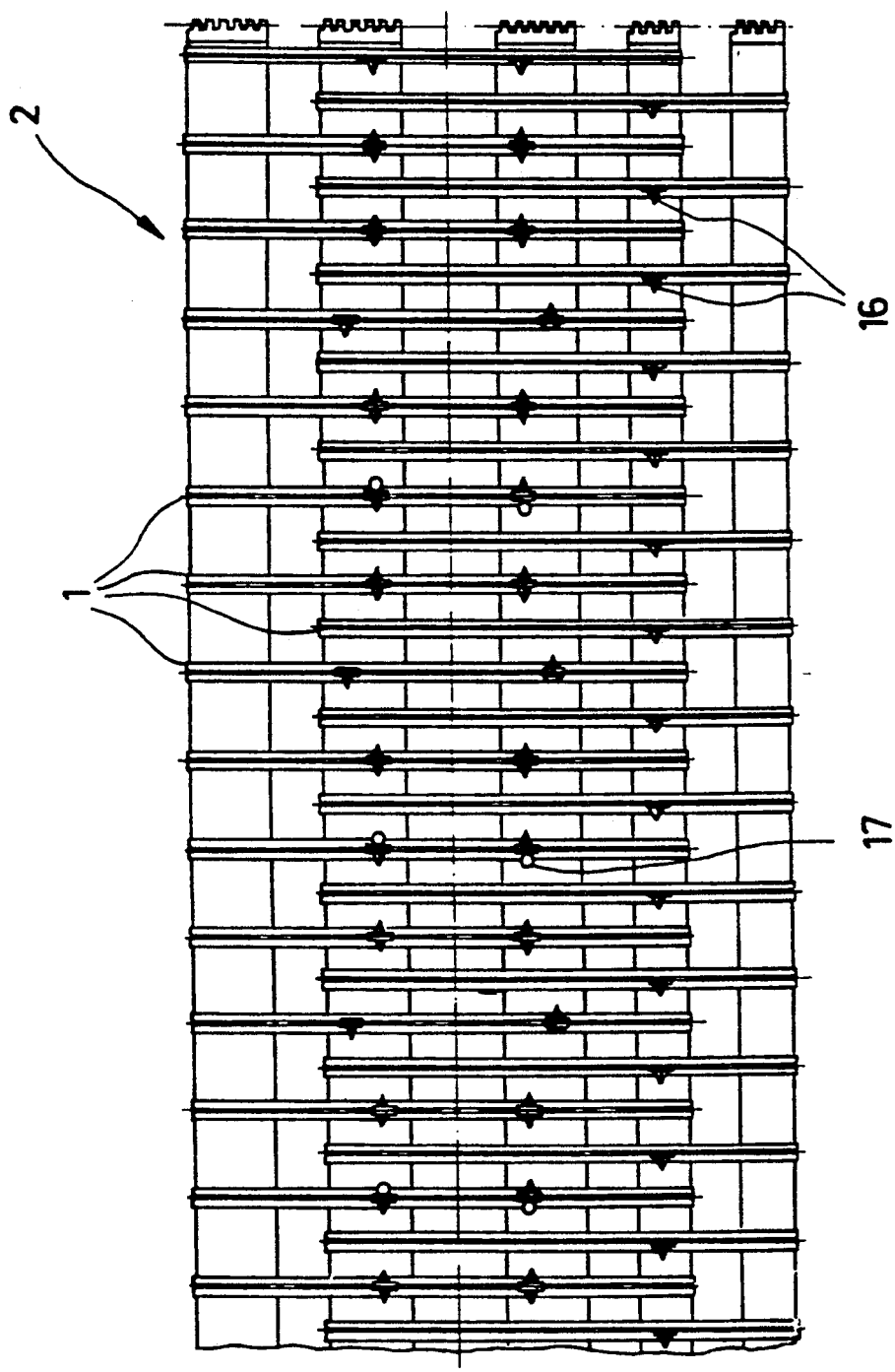
FIG. 4 shows a fragmentary top view of a track equipped with steel crosspieces according to the invention.

The embodiment according to FIG. 1 shows a steel crosspiece 1 of the type provided for tracks 2 according to FIG. 4. These tracks are used for track-type vehicles, which, during the summer, are used in the fields of agriculture and forest economy, whereas, during the winter, they are mainly used for preparing pistes and cross-country skiing courses.

The track shown in FIG. 4 is equipped with a total number of five rubber bands 3, which extend parallel to one another and which are aligned in the direction of motion, said rubber bands having transversely secured thereto a plurality of steel crosspieces 1. When seen in cross-section, each steel crosspiece comprises a U-shaped yoke 4, which is composed of two U-legs 5 and 6 as well as of a connection web 7 extending therebetween. The U-legs are aligned parallel to each other and they extend at right angles to the connection web 7. An important point is that the radii 8 in the corners between the U-legs and said connection web are comparatively small. This can be achieved by a rolling operation. The small radii have the effect that the area of contact between the connection web 7 and the rubber band associated therewith is enlarged. It follows that, other than in the case of the known solutions, it is no longer necessary to use support means for making this area of contact sufficiently large and for avoiding damage at the location of connection between the steel crosspiece and the rubber band.

The first U-leg 5 has a connecting leg 10 as an extension which is directed upwards, i.e. away from the rubber band, said connecting leg 10 extending slightly inwards via a bend 9. The length of this leg is slightly greater than that of the U-legs 5 and 6.

Subsequent to an additional bend 11, a sword 12 is provided, which projects outwards at right angles with respect to the connection web 7 and which, in the present case, has approximately the same length as the U-legs 5 and 6. The free end of the sword defines the actual contact surface with which the steel crosspiece rests on the ground.

Via a bend 13, the second U-leg 6 is provided with a second connecting leg 14, which is bent inwards as well and the free end of which is durably connected, e.g. by means of welding, to said first connecting leg 10 in the area of the bend 11.

The U-shaped yoke with its U-legs 5 and 6 and its connection web 7 as well as the connecting legs 10 and 14 define between them a hollow space 21 having the shape of a house which is provided with an acute-angled saddle roof.

In the present case, the steel crosspiece has a symmetrical structural design with respect to the vertical. It defines a closed profile, whereby advantageous resistance values and a low torsional stress are guaranteed. In view of the fact that the profile of the steel crosspiece is symmetrical, the crosspiece can be used equally for the left as well as for the right track of the vehicle.

The steel crosspiece according to FIG. 1 is made of a high-strength, fine-grained steel, which is particularly suitable for cold-working processes and which is adapted to be welded. This steel is also well suited for the production of the small radii desired in the area of the connection web.

In order to be able to connect the steel crosspiece with the rubber bands 3, an apron 15, which projects inwards into the hollow space, was formed with the aid of the flow-drilling method in the case of the present embodiment in the bisecting line outlined in FIG. 1. This apron can be seen in FIG. 2. When flow drilling is carried out, the steel sheet of the steel crosspiece is pierced at the desired drilling point with the aid of a fast rotating mandrel, whereupon, due to the flow of material, the displaced material will build up inwards in an apronlike manner. A thread can be inserted in the apron, e.g. by stamping, whereby the material in the area of the apron will be further compacted.

With the aid of flow drilling, fastening can be achieved at any desired location of the steel crosspiece, no matter whether the steel crosspiece is to be anchored in the rubber bands, or whether the elements to be anchored are additional accessory parts, e.g. guide plates 16 or spikes 17. This is advantageous especially insofar as it is thus possible to utilize—without making use of any special additional elements—the cavity of the steel crosspiece for the purpose of anchoring specific parts.

Figure 2:
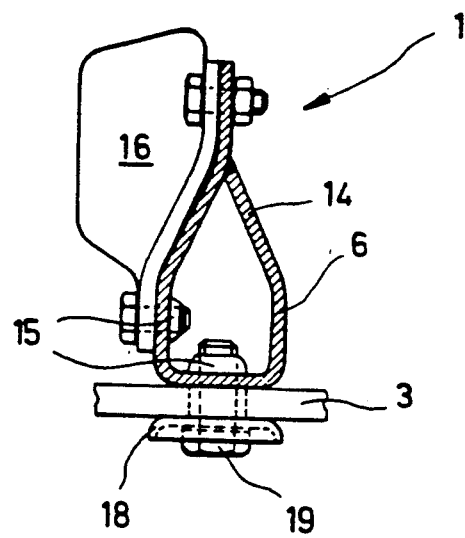
FIG. 2 shows a vertical section through a mounted steel crosspiece according to FIG. 1, which has been machined in accordance with the flow-drilling method and which is provided with a guide plate.
Figure 3:
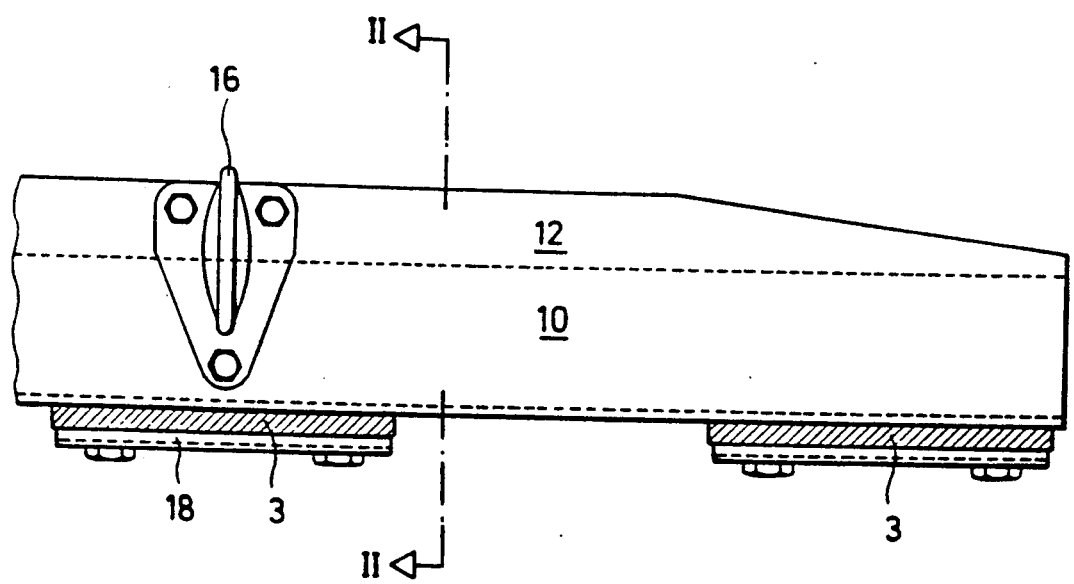
FIG. 3 shows a fragmentary side view of a steel crosspiece according to FIG. 1 and 2.

FIG. 3 shows a side view of a steel crosspiece according to FIG. 1 and 2, which has already been fully mounted on the rubber bands 3. In connection with FIG. 2, it ca be seen that the guide plates 16, which have a triangular shape when seen in a top view, are each provided with two fastening screws in the area of the sword 12 as well as with one fastening screw in the base area thereof. The last-mentioned base area is anchored through a fastening screw, which, in turn, is screwed into an apron formed in the interior hollow space according to the flow-drilling method.

From FIG. 2 and 3, it can be seen that the heads of the fastening screws rest on supports 18, which serve as an intermediate layer towards the bands 3.

Figure 5:
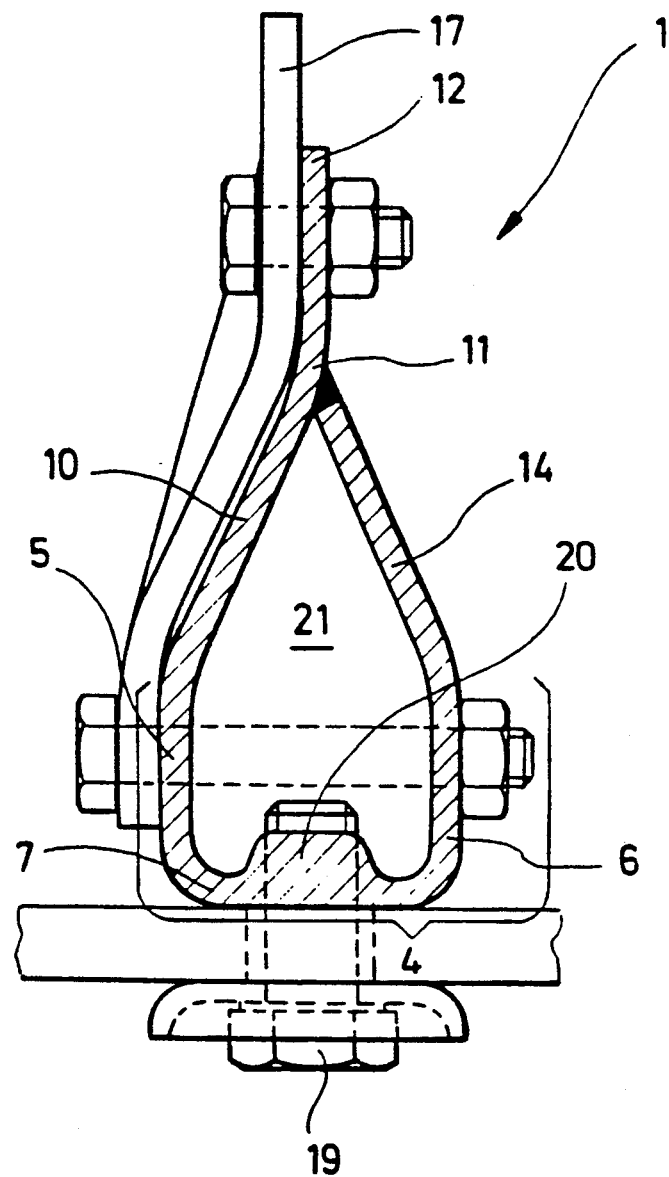
FIG. 5 shows a vertical section through an additional embodiment of the present invention, which consists of a hot-rolled steel section equipped with a spike.

Whereas the steel crosspiece according to FIG. 1 to 3 is made of a cold-rolled steel sheet having approximately the same thickness of material throughout its whole surface, the steel crosspiece according to FIG. 5 is produced by means of hot rolling. Fundamentally, it has the same structural design as the steel crosspiece according to FIG. 1. Hence, identical parts are provided with identical reference numerals. In order to connect the fastening screws 19 with this embodiment of the steel crosspiece, a strip 20 has been formed on the inner side of the connection web 7 during the hot-rolling process, said strip 20 thickening said connection web 7 and having inserted therein, according to requirements, a tapped hole for the fastening screws 19. The strip extends along the whole length of the web.

Figure 6:
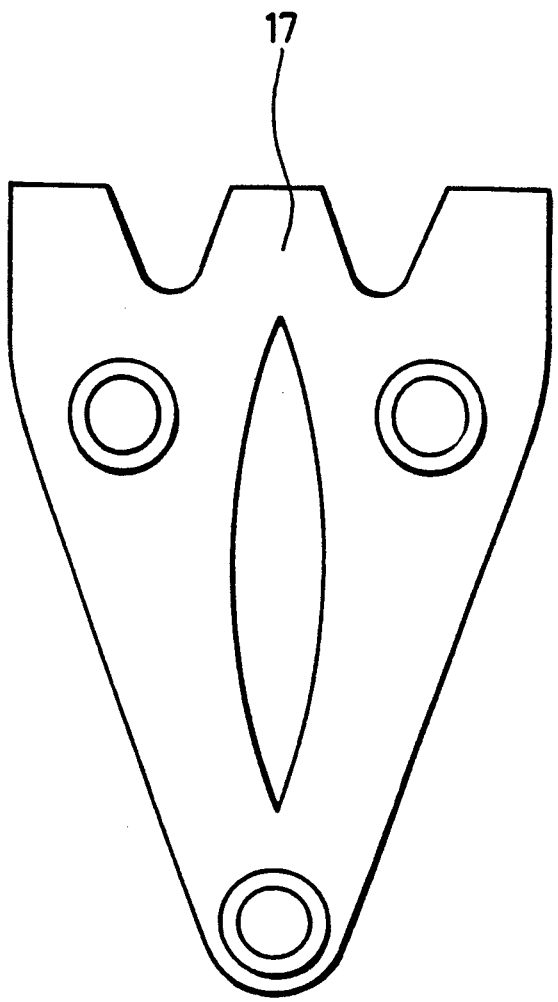
FIG. 6 shows a front view of the spike of FIG. 5.

FIG. 5 shows in addition the attachment of a spike 17. FIG. 6 shows a side view of said spike 17. Analogously with the guide plate, said spike has an approximately triangular shape. Its upper, broader end is equipped with two fastening screws, whereas its lower end has provided therein one fastening screw. In the case shown, said one lower fastening screw extends through the hollow space 21 and is anchored by a counternut only in the area of the second U-leg 6.

Figure 7:
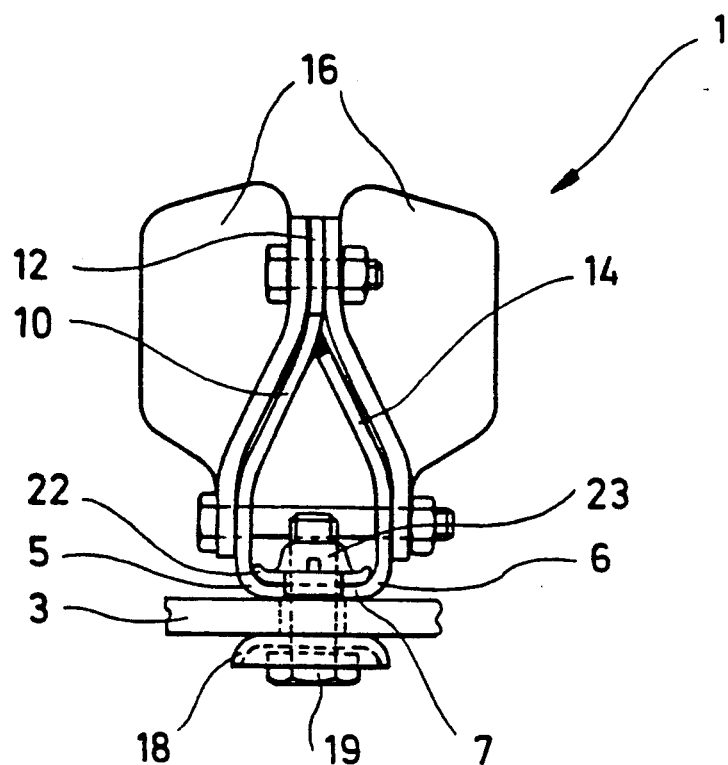
FIG. 7 shows a side view of an additional embodiment of the present invention in the case of which the steel crosspiece is provided with guide plates on both sides and has in its hollow space a similar strip for accommodating the fastening screws.

FIG. 7 shows an additional embodiment of the invention. Fundamentally, it can again be said that this steel crosspiece has the same structural design as the embodiment according to FIG. 1 to 3. Identical parts are provided with identical reference numerals.

In the case of this embodiment, the steel crosspieces are anchored to the bands 3 with the aid of inserts having each the form of an insert strip 22. With respect to its cross-section, said insert strip is adapted to the inner form of the connection web 7, and, for providing a sufficient thickness of material for tapped holes, it is provided with a thickened portion 23 projecting inwards into the hollow space 21. The insert strip 22 offers the advantage that the steel crosspiece has to be provided with through holes only at the necessary locations, whereas the actual anchoring of the fastening screws 19 takes place between the supports 18 and the tapped holes provided in the insert strip 22.

Figure 8:
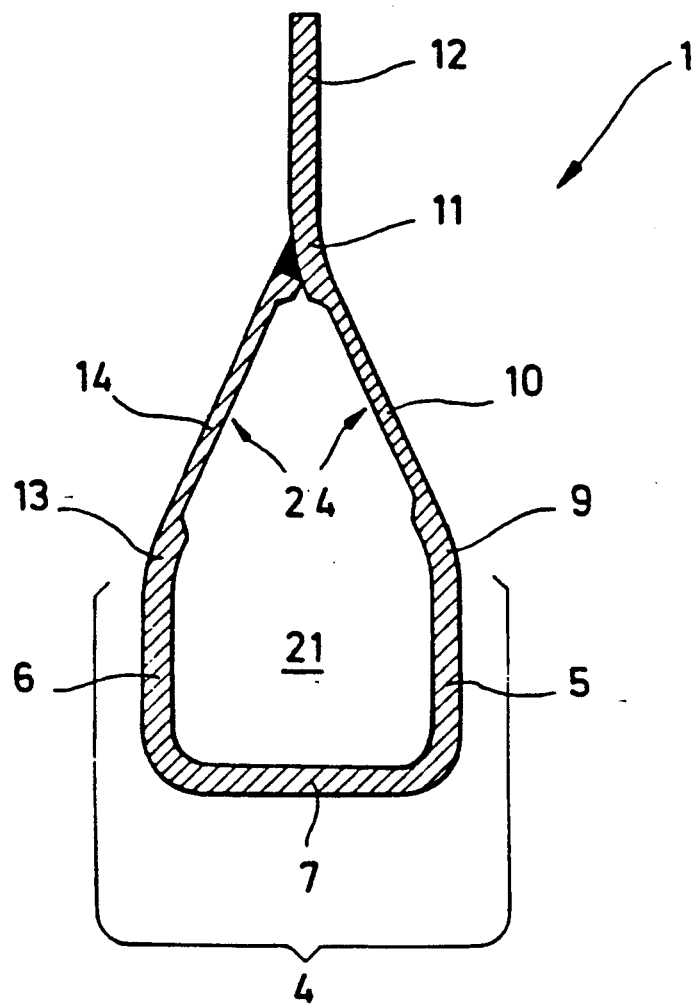
FIG. 8 shows a cross-section through a steel crosspiece according to the invention whose connecting legs have a reduced thickness of material.

FIG. 8 shows an additional embodiment of the steel crosspiece according to the invention. For the sake of simplicity, identical parts are provided with the same reference numerals as in the case of the preceding embodiments. In the following, only the differences will be discussed.

In the case of the steel crosspiece according to FIG. 8, both connecting legs 10 and 14 are legs having a reduced thickness of material. Both said legs are provided with cup-shaped recesses 24, which have a U-shaped cross-section and which, in the present case, extend along almost the whole length of said two connecting legs. The recesses are arranged symmetrically with respect to the plane of the sword 12 so that the profile of the steel crosspiece has an axially symmetrical structural design.

The reduction of the thickness of material is chosen such that the connecting legs 10, 14 are softer than the U-legs 5 and 6 of the U-shaped yoke 4. This results in a very advantageous combination between the dimensional stability of the U-shaped yoke 4 and the shock-absorbing capacity of the connecting legs 10 and 14 converging in a V-shape.

If an asymmetric dampening effect is to be achieved, there will be the possibility of weakening the thickness of material of only one of the two connecting legs, or the possibility of providing different thicknesses of material in the case of the two connecting legs.

The present invention is not limited to the embodiments shown. In particular, it will also be possible to vary the wall thickness of the U-legs e.g. for achieving a dampening effect in this area as well. It follows that, in the case of the steel crosspiece according to the invention, a combination of such a nature is imaginable that one or both connecting legs have an unreduced wall thickness, whereas the wall thickness of one or of both U-legs is reduced so as to produce a dampening effect.

If the elements reduced in thickness are only the connecting legs, the U-shaped yoke will define the dimensionally stable backbone; if, however, the U-legs are reduced in thickness, the V-shape of the connecting legs will be able to offer a dimensionally stable support. Combinations of the variants just mentioned are possible, if the dimensional stability on the one hand and the absorption behaviour on the other are to be varied within the houselike hollow space 21.

What is new claimed is:

1. In a track for track-type vehicles, wherein a plurality of bands extend parallel to one another in the direction of vehicle movement, each band having secured thereto transversely extending crosspieces, said crosspieces each comprising: a single sheet metal blank cross-sectionally shaped to define a hollow enclosure having a U-shaped yoke with a connecting web extending between parallel side walls, said side walls having integral inclined leg segments extending angularly away from said connecting web and inwardly towards each other to a welded juncture, with one of said leg segments extending beyond said welded juncture to define a planar sword protruding exteriorly of said enclosure.

2. A track according to claim 1, wherein said steel crosspiece comprises a high-strength fine-grained steel.

3. A track according to claim 1, wherein said steel crosspiece comprises a cold-rolled steel sheet having approximately the same thickness throughout said crosspiece.

4. A track according to one of claims 1-3, wherein said planar sword is symmetrically disposed with respect to said U-shaped yoke and extends at right angles to said connecting web.

5. A track according to claim 4, wherein at least one of said two inclined leg segments is thinner than the parallel side walls.

6. A track according to claim 5, wherein at least one of said inclined leg segments is provided with a recess on its inner side.

7. A track according to claim 6, wherein said recess extends essentially along the entire length of the inclined leg segments.

8. A track according to claim 7, wherein said hollow enclosure has a cupshaped form and wherein the edges of said recess have gently rounded transitions merging with the non-reduced portions of said leg segments.

9. A track according to one of claim 1-3, wherein said parallel side walls are symmetrically disposed with respect to said U-shaped yoke.

10. A track according to claim 9, wherein at least one of said two inclined leg segments is thinner than the parallel side walls.

11. A track according to claim 10, wherein at least one of said inclined leg segments is provided with a recess on its inner side.

12. A track according to claim 11, wherein said recess extends essentially along the entire length of the inclined leg segments.

13. A track according to claim 12, wherein said hollow enclosure has a cupshaped form and wherein the edges of said recess have gently rounded transitions merging with the non-reduced portions of said leg segments.

14. A track according to one of claims 1-3, wherein said connection web includes holes disposed therein for fastening said steel crosspieces to the bands with screws.

15. A track according to claim 14, wherein said holes are bordered by aprons which project into said hollow enclosure, said aprons having a female thread.

16. A track according to one of claim 1-3, wherein said hollow enclosure is adapted to receive at least one insert for interconnecting said steel crosspieces and the bands, said insert having tapped holes disposed therein.

17. A track according to claim 16, said insert further comprising an insert strip.

18. A track according to claim 1, wherein at least one of said two inclined leg segments is thinner than the parallel side walls.

19. A track according to claim 18, wherein at least one of said inclined leg segments is provided with a recess on its inner side.

20. A track according to claim 19, wherein said recess extends essentially along the entire length of the inclined leg segments.

21. A track according to claim 20, wherein said hollow enclosure has a cupshaped form and wherein the edges of said recess have gently rounded transitions merging with the non-reduced portions of said leg segments.

* * * * *